(12) United States Patent  (10) Patent No.: US 6,571,068 B2
Shimizu  (45) Date of Patent: May 27, 2003

(54) VIEW FINDER HAVING AN OBJECT LENS SYSTEM AND AN EYE-PIECE LENS SYSTEM ARRANGED ON A COMMON SHAFT

(75) Inventor: Motokazu Shimizu, Saitama (JP)

(73) Assignee: Fuji Photo Optical Co., Ltd., Saitama (JP)

(*) Notice: Subject to any disclaimer, the term of this patent is extended or adjusted under 35 U.S.C. 154(b) by 68 days.

(21) Appl. No.: 09/822,372

(22) Filed: Apr. 2, 2001

(65) Prior Publication Data

US 2001/0026685 A1 Oct. 4, 2001

(30) Foreign Application Priority Data

Mar. 31, 2000 (JP) .......................... 2000-099365

(51) Int. Cl.[7] .......................... G03B 13/10; G03B 13/02
(52) U.S. Cl. .................. 396/379; 396/382; 396/384
(58) Field of Search .......................... 396/373, 378, 396/379, 382, 383

(56) References Cited

U.S. PATENT DOCUMENTS 5,727,245 A * 3/1998 Asakura et al. ............. 396/378

* cited by examiner

Primary Examiner—Russell Adams
Assistant Examiner—Arthur A Smith
(74) Attorney, Agent, or Firm—Young & Thompson

(57) ABSTRACT

The invention relates to a view finder with improved structure for providing accurate posisioning and alignment of optical elements of its optical system. The view finder comprises an object lens system at least one lens of which is movable along an optical axis of the object lens system being guided by a first guide shaft and an eye-piece lens system at least one lens of which is movable along an optical axis of the eye-piece lens system being guided by a second guide shaft, wherein the first guide shaft and the second guide shaft are positioned in axial alignment. Preferably the first guide shaft and the second guide shaft are integrally formed and immovable optical elements such as fixed lens and prism of the optical system are also supported by the same guide shaft.

7 Claims, 6 Drawing Sheets

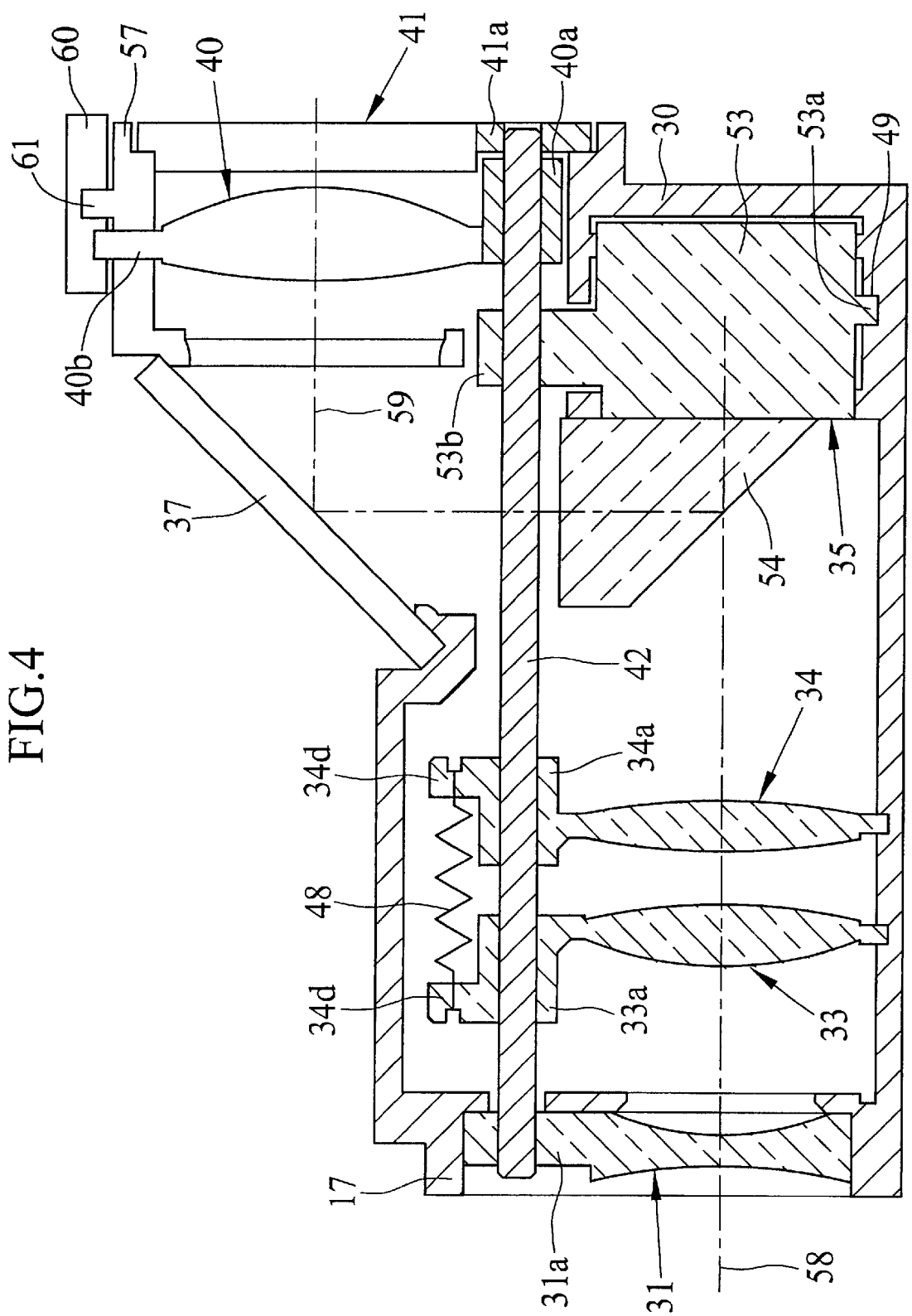

VIEW FINDER HAVING AN OBJECT LENS SYSTEM AND AN EYE-PIECE LENS SYSTEM ARRANGED ON A COMMON SHAFT

FIELD OF THE INVENTION

This invention relates to a viewfinder. More specifically, this invention relates to a view finder capable of varying a magnification in accordance with a movement of taking lens of camera for zooming.

BACKGROUND OF THE INVENTION

A view finder, capable of varying a magnification in accordance with a movement of taking lens of camera for zooming, usually includes a finder optical system capable of varying magnification of a finder image and an interlocking mechanism for shifting a movable lens in the finder optical system along the optical axis. A real-image type lens system is usually used for the finder optical system, which usually includes two movable lenses. Some finder has a diopter moving mechanism where eyepiece side lens is movable so as to match an eyesight of the user, such as a near-sighted or a far-sighted, in order to make the finder image of a subject clearer.

Aforementioned movable lenses in the finder optical system for zooming or diopter movement require high accuracy positioning and alignment. Also immovable optical elements other than the movable lenses must be fixed in the finder with high accuracy positioning and alignment. However, positioning and alignment of those optical elements are not always accurate because respective elements are held by respective holding members supported by respective local structure of the finder housing, which cause low optical performance. Also a guide shaft for guiding a movable lens for zooming is different one from a guide shaft for guiding a movable lens for diopter movement, which causes increase of the number of parts and manufacturing costs.

SUMMARY OF THE INVENTION

An object of the invention is to provide a view finder with high accuracy and low cost holding means for holding optical elements constituting a view finder.

To establish the object, a view finder of this invention comprises an object lens system at least one lens of which is movable along an optical axis of the object lens system being guided by a first guide shaft and an eye-piece lens system at least one lens of which is movable along an optical axis of the eye-piece lens system being guided by a second guide shaft, wherein the first guide shaft and the second guide shaft are positioned in axial alignment. It is preferable to make the first guide shaft and the second guide shaft formed integrally. The diameters of the two parts can be the same.

Also the optical axis of the object lens system and the optical axis of the eyepiece lens system can be different from each other, and the object lens system can be capable of varying a magnification of a finder image by moving at least one lens of the object lens system and the eyepiece lens system may be capable of diopter movement by moving at lease one lens of the eyepiece lens system.

There are two types of finder in ways of fixing the guide shaft. A first type view finder comprises a lens movable along the optical axis being guided by a guide shaft which is fixed to a finder housing and an immovable optical element mounted to the guide shaft which constitutes a finder optical system of the view finder together with the movable lens. A second type view finder comprises a lens movable along the optical axis being guided by a guide shaft and an immovable optical element which constitutes a finder optical system of the view finder together with the movable lens, wherein the guide shaft is fixed to the immovable optical element

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein:

FIG. 4 shows a cross sectional view of the finder of the invention;

DETAILED DESCRIPTION OF THE INVENTION

Figure 1:
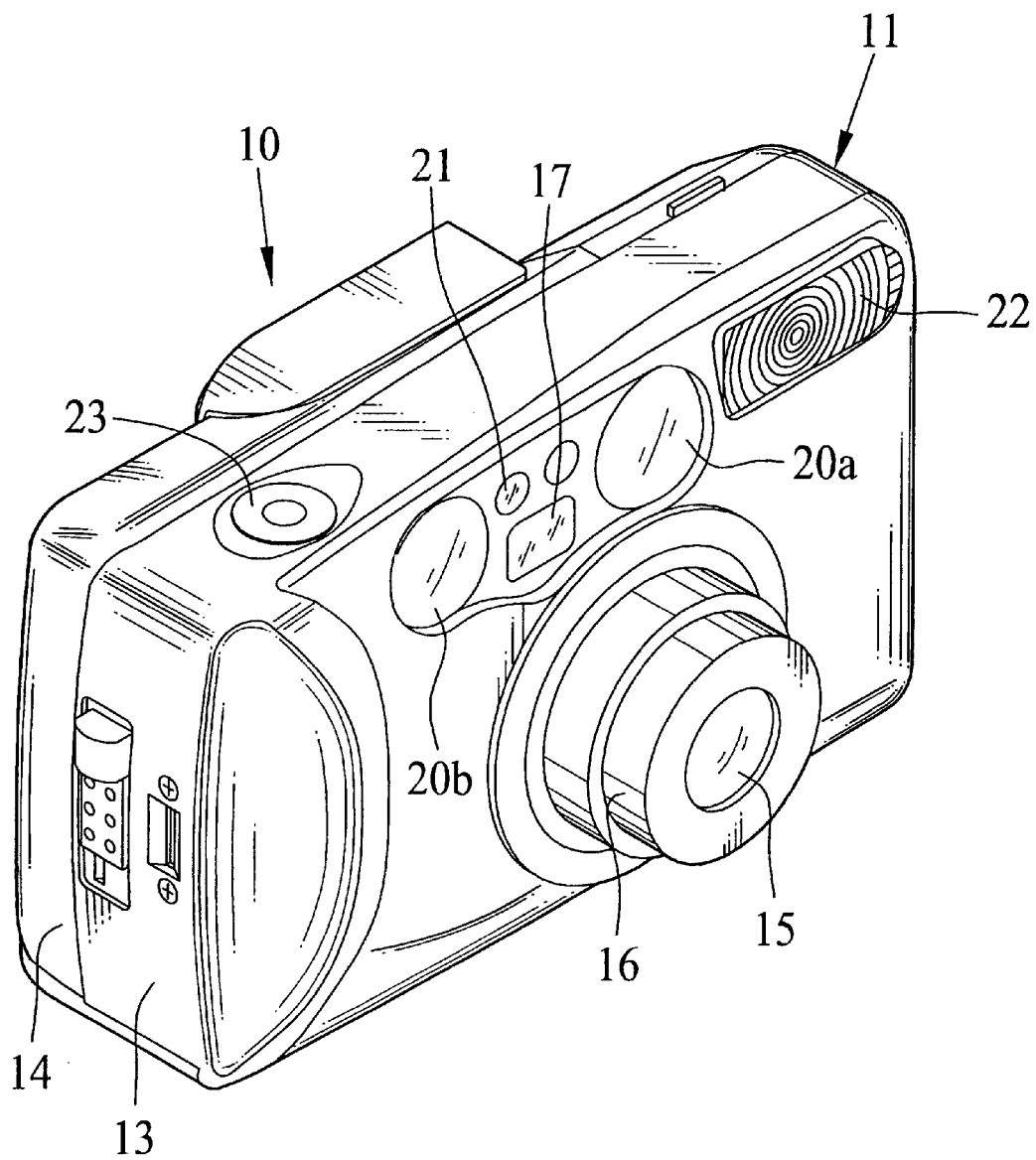
FIG. 1 shows an external perspective view of a camera where a finder of the invention is used.

FIG. 1 shows an external perspective view of the camera where a finder of the invention is used. A camera 10 is made of a camera body 11 and a variety of photographing mechanism installed therein. The camera body 11 includes abase frame 12 (See FIG. 2), a front cover 13 for covering front side of the base frame 12 and a rear cover 14 for covering rear side.

The front side of the camera has a zoom lens barrel 16 for holding a taking lens of zooming optical system, an object side finder window 17, a distance-measuring light emitting window 20a and a distance-measuring light receiving window 20b, a metering light receiving window 21 and a flash unit 22. Top side of the camera body 11 has a shutter releasing button 23. The zoom lens barrel 16 is extended out of the body 10 when power is on. The rear side of the camera body 10 includes switches for zooming the lens barrel, selecting a photographing mode, adjusting diopter of the finder, a LCD panel for displaying a variety of information and an eyepiece window.

Figure 2:
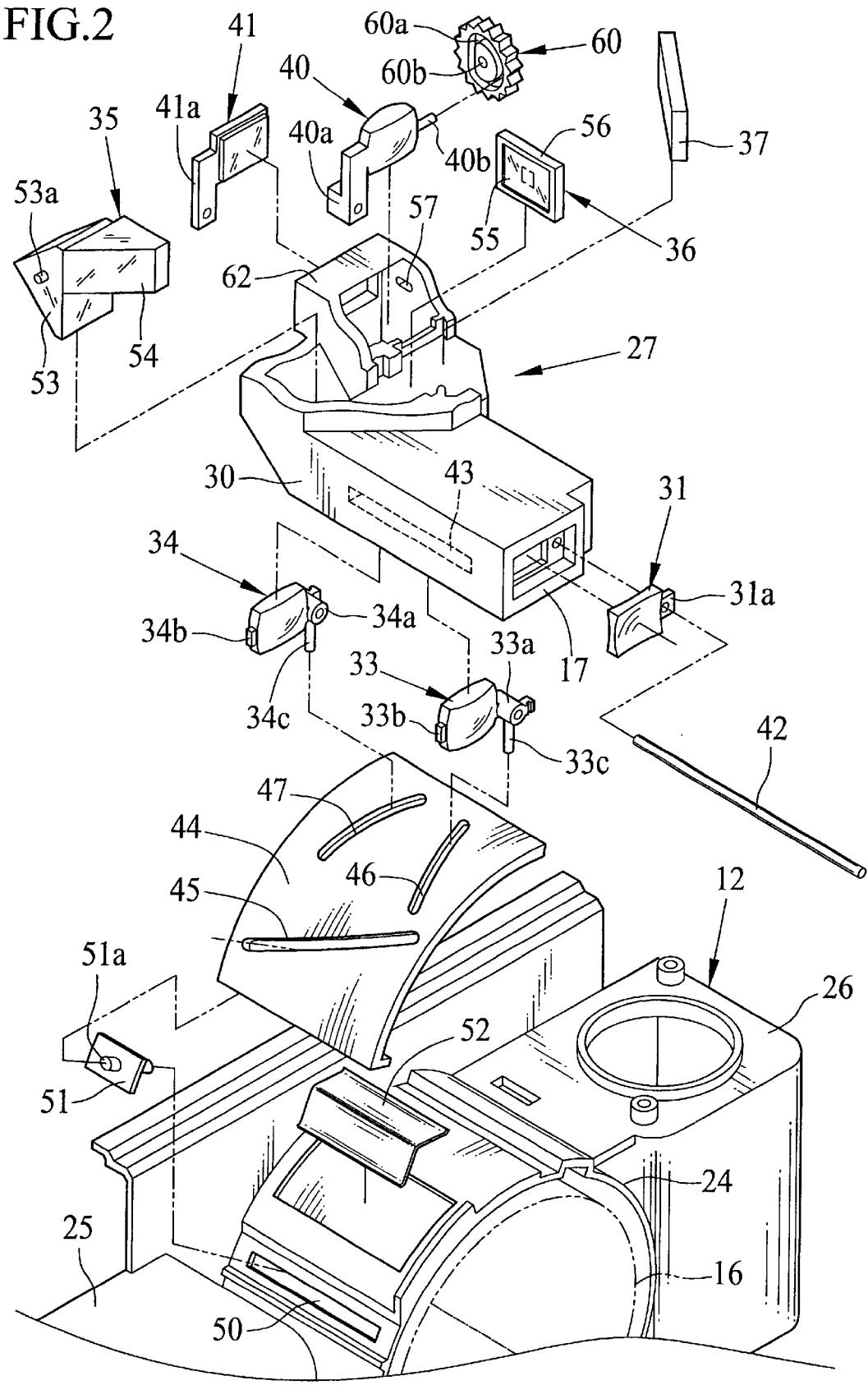
FIG. 2 shows an exploded perspective view of a finder and shifting mechanism of the invention for shifting a movable lens for varying magnification of finder image.

As shown in FIG. 2, a fixed barrel into which the zoom lens barrel 16 is installed, a film cartridge loading chamber 25 and a film take-up chamber 26 for taking up the film withdrawn from the film cartridge are integrally formed in the base frame 12. The fixed barrel 24 is disposed between the film cartridge loading chamber 25 and the film take-up chamber 26.

A view finder 27 is mounted above the fixed barrel 24. The view finder includes a variety of optical elements, disposed along an optical axis of the finder, constituting a finder optical system and a finder housing frame 30 made of plastic block for holding the variety of optical elements.

Figure 3:
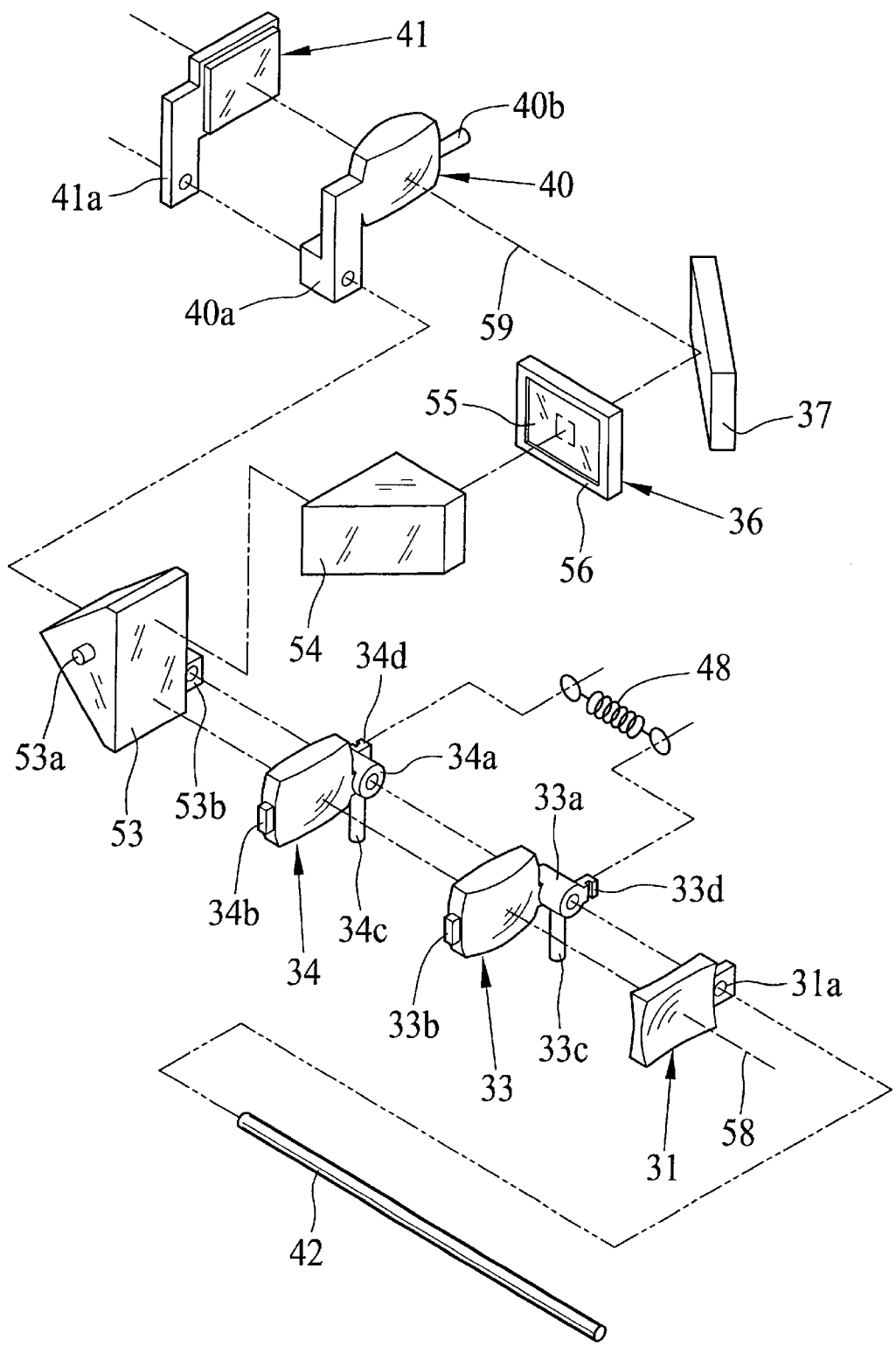
FIG. 3 shows an exploded perspective view of the finder optical elements indicating disposition of the elements.

As shown in FIG. 2 and FIG. 3, the finder optical system for a real-image type zoom finder is made of an object lens 31, first varying magnification lens 33, second varying magnification lens 34, a porro-prism 35, a field of view frame 36, a reflex mirror 37, a diopter moving lens 40 and eyepiece lens 41, which are disposed from object side in order. In the front of the finder housing frame is a finder object side window 17. The object lens 31 is fitted behind the finder object side window 17 and has a holding portion 31a to hold a guide shaft 42 (described later).

The first and second varying magnification lenses are movable along a finder object side optical axis 58. They have integrally formed bearing portions 33a, 34a and guiding projections 33b, 34b on their both side respectively. The guiding projections 33b, 34b, are engaged with a guide rail 43 set inside the finder housing frame 30 and the bearing portions 33a, 33b receive a guide shaft 42 parallel to the optical axis 58 therethrough. Thus the movement of the first and second varying magnification lenses 33, 34 are guided by the guiderail43 and the guide shaft 42. Each bottom side of the bearing portions 33a, 34a has cam pins 33c, 34c projecting downwardly respectively, which are engaged with a cam plate 44 fixed to the outer surface of the fixed barrel 24.

The cam plate 44 is bent along the outer surface of the fixed barrel 24 so as to rotate around the optical axis of taking lens system along the outer surface of the barrel 24. A cam groove 45 and a pair of cam grooves 46,47 are formed in the cam plate 44. One end portion 51a of an interlocking pin 51 which is extended out from a slot 50 formed in the fixed barrel 24 is engaged with the cam groove 45. The other end of the interlocking pin 51 is fitted in an opening (not shown) formed in the zoom lens barrel 16 which moves back and forth inside the fixed barrel 24 when zooming is made, which causes the interlocking pin 51 to move along the taking lens optical axis. The movement of the interlocking pin 51 makes the cam plate 44 rotate around the optical axis. The rotational displacement of the cam plate 44 directly indicates the position of the zoom lens barrel 16, namely the magnification of the zooming.

The cam pins 33c, 34c formed in the first and second varying magnification lenses 33, 34 respectively are engaged with the pair of cam grooves 46, 47 respectively. Patterns of the cam grooves 46, 47 are predetermined so that the movement of the first and second varying magnification lenses 33, 34 can make finder optical system always match the zoom taking lens system in image magnification as zoom lens barrel 16 moves for zooming. A leaf spring 52 is disposed between the outer surface of the fixed barrel 24 and the cam plate 44 to lightly push up a upper portion of the cam plate 44, which keeps respective engagement between the cam pins 33c, 34c and cam grooves 46, 47 without fail.

As shown in FIG. 3, the bearing portions 33a, 34a have projections 33d, 34d with recess respectively. Each end of a spring 48 is hooked over each of the projections 33d, 34d by using the recess. Two lenses 33, 34 are spring-biased toward each other by that, by which the cam pin 33c is biased to keep in contact with the inner wall of eyepiece side of the cam groove 46, and the cam pin 34c is biased to keep in contact with the inner wall of object side of the cam groove 47. As a result, two lenses 33, 34 are positioned without fluctuation in the optical axis 58, regardless of rotating direction of the cam plate 44.

A porro-prism 35 is made by forming two right angle prism 53, 54 integrally, which functions as an erect prism for transforming a reverse image both vertically and horizontally into a correct image. The first right angle prism 53 has a positioning boss 53a on its one side.

FIG. 4 shows a cross sectional view of the finder of the invention. The positioning boss 53a is fitted into a positioning hole 49 which is formed inside the finder housing frame 30. On the other side of the first right angle prism 53 is formed integrally a holding portion 53b to hold the guide shaft 42. One end of the guide shaft in object side is fitted into a hole formed in the holding portion 31a of the object lens 31 and the other end in eyepiece side is fitted into a hole formed in the holding portion 53b. Thus the guide shaft 42 is fixed inside the finder housing by both the object lens 31 and the porro-prism 53.

The field of view frame 36 for framing a field of view is disposed in a position where the image of the subject is focussed through the object lens 31, the first and second varying magnification lenses 33, 34. The field of view frame 36 is constituted by a focus plate lens 55 where target mark and parallax correction mark are engraved and a focus plate lens holder 56 for holding the focus plate lens 55. A field of view changing mechanism can be applied to the finder of the invention, which is manually or automatically changed according to the change in size or aspect ratio of image to be photographed on the film or the like.

The diopter moving lens 40 are movable along an eyepiece side optical axis 59. It has integrally formed mounting portion 40a and a cam pin 40b on its both side respectively. The mounting portion 40a with a hole is mounted on a guide shaft 42 parallel to the optical axis 59 by the hole. The cam pin 40b reaches cam groove 60a, which is formed on the side of a gear wheel 60 disposed outside the finder housing 30, through a guide slot 57 formed in the finder housing 30 to be engaged with the cam groove 60a.

Figure 5A:
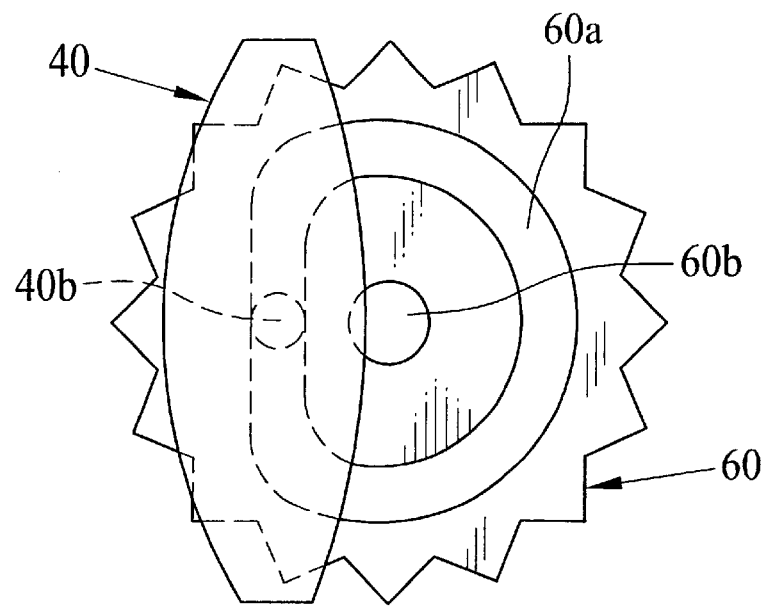
FIG. 5A. shows a schematic illustrating a mechanism for shifting a diopter moving lens where the diopter moving lens is located near to the user.
Figure 5B:
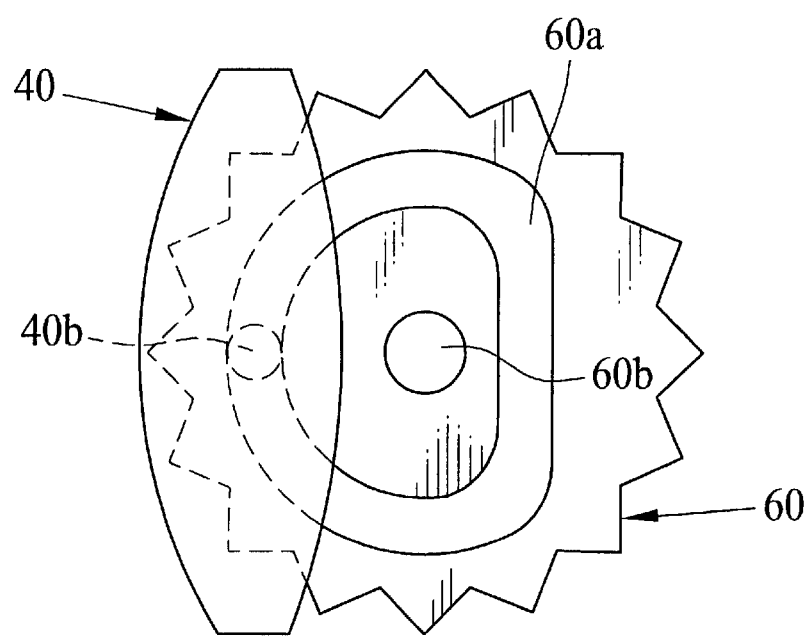
FIG. 5B. shows a schematic illustrating a mechanism for shifting a diopter moving lens where the diopter moving lens is located far from the user.

The gear wheel 60 is supported in the center by a pin 61 (See FIG. 4) formed on the finder housing 30 and is rotated around the pin 61 by a motor (not shown). The gear wheel 60 can be rotated manually by exposing its portion outside of the camera. As shown in FIG. 5A or 5B, the shape of the cam groove 60a is not a circle. The distance between the groove and the rotation center changes along the groove in order to move the diopter moving lens 40 back and forth for diopter movement via the engagement between the cam pin 40b and the cam groove 60a as the gear wheel rotates.

The eyepiece lens 41 disposed inside the finder eyepiece window 62 has integrally formed mounting portion 41a projecting downwardly. The mounting portion 41a has a hole by which the eyepiece lens 41 is mounted on the guide shaft 42 to be held.

According to aforementioned structure of the finder, the first movable lens 33 and the second movable lens 34 are supported by the guide shaft 42. Those lenses guided by the guide shaft 42 move back and forth along the finder object side optical axis 58 to vary magnification of the finder image during zooming operation. Also the diopter moving lens 40 supported by the guide shaft 42 is moved back and forth by motor or manual operation for diopter movement.

Thus all the movable lenses of the finder optical system are supported and positioned by the single common shaft, which will minimize possible fluctuation of positioning or misalignment of the lenses and reduce the number of parts to be used which leads to cost reduction.

Figure 6:
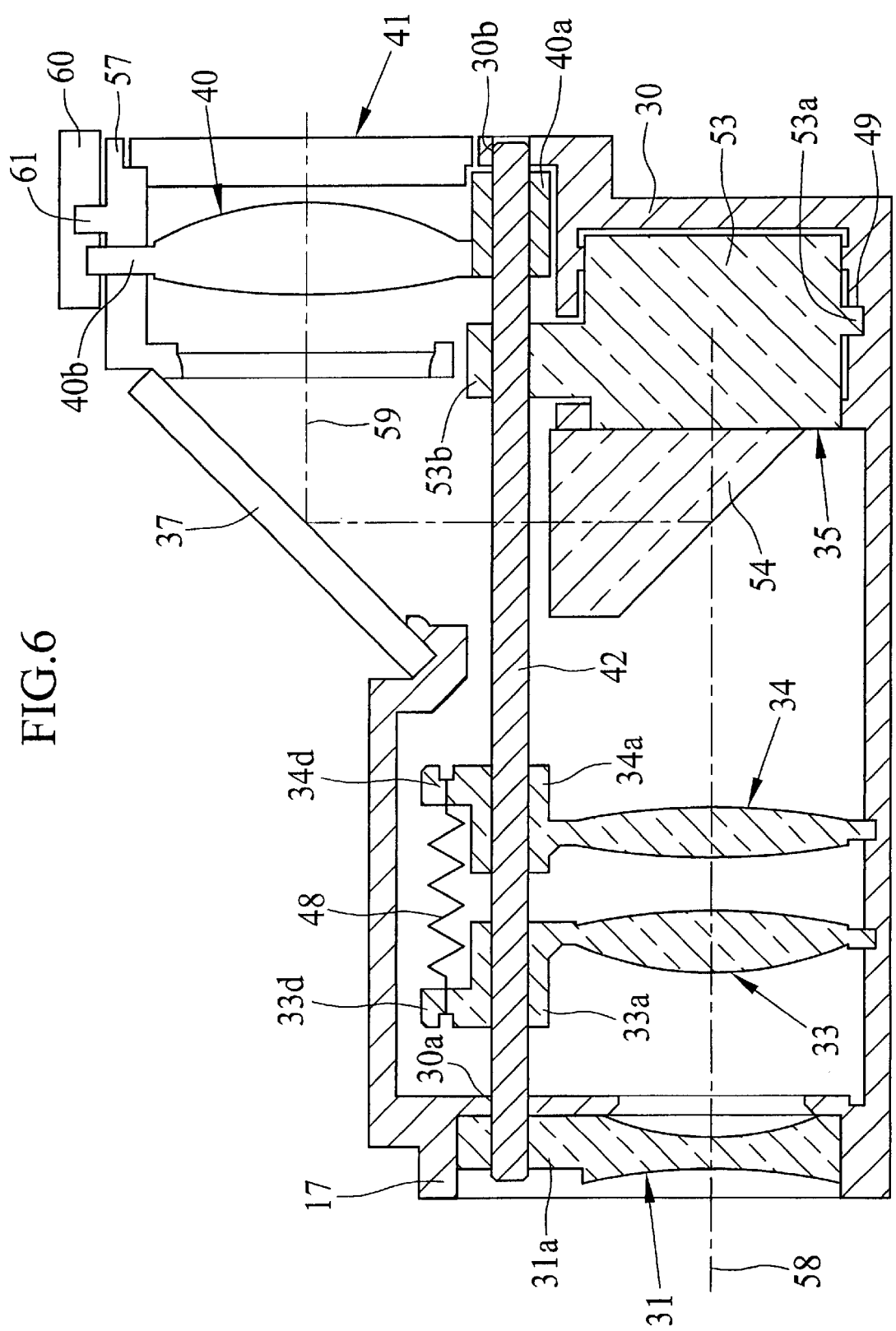
FIG. 6 shows a cross sectional view of the finder of another embodiment of the invention.

In the aforementioned structure, the guide shaft 42 is directly supported by the object lens 31 and the porro-prism 35 which are fixed to the finder housing. As shown in FIG. 6, it is also possible that the guide shaft 42 is fixed directly in both hole 30a and hole 30b which are formed in a front wall and a rear wall of the finder housing respectively, and the object lens 31 and the porro-prism 35 are supported by the guide shaft 42. In this embodiment, the immovable optical elements such as the object lens 31 and the porro-prism 35 are also supported by the same single guide shaft in addition to the movable lenses. In other words, all the optical elements are set directly on the same foundation. This will minimize possible fluctuation of positioning or misalignment of not only the movable lenses but also the immovable optical elements, which leads to total improvement of the finder optical system.

In the embodiment described above, the object side optical axis 58 is different from the eyepiece side optical axis 59. But it is possible for both sides to have the common optical axis. The diameter of guide shaft in the eyepiece side can be not only the same as the one in the object side but also different from the one in the object side. Also the guide shaft can be divided into two portions one of which is for the eyepiece side and the other for the object side as long as they have common axis.

Thus, the present invention is not to be limited to the above embodiments, but on the contrary, various modifications are possible to those skilled in the art without departing from the scope of claims appended hereto.

What is claimed is:

1. A view finder comprising:

an object lens system at least one lens of which is movable along an optical axis of the object lens system being guided by a guide shaft; and an eye-piece lens system at least one lens of which is movable along an optical axis of the eye-piece lens system being guided by the guide shaft;

wherein the eye-piece lens system and the object lens system are arranged so that light passing through the object lens system is reflected before reaching the eye-piece lens system.

2. A view finder as defined in claim 1, wherein the optical axis of the object lens system and the optical axis of the eyepiece lens system are different from each other, the object lens system is capable of varying a magnification of a finder image by moving at least one lens of the object lens system and the eyepiece lens system is capable of diopter movement by moving at least one lens of the eyepiece lens system.

3. A view finder as defined in claim 2, wherein the object lens system includes two object lenses which are movable along the optical axis of the object lens system.

4. A view finder as defined in claim 3, further comprising:

a rotatable cam plate with two cam grooves, one end of the object lenses being engaged with the cam groove, the object lenses moving along the optical axis of the object lens system in accordance with rotation of the cam plate.

5. A view finder as defined in claim 4, further comprising:

a spring for biasing the two object lenses toward one another.

6. A view finder comprising:

an object lens system comprising at least one movable object lens slidably mounted on a guide shaft;

an eye-piece lens system comprising at least one movable eye-piece lens slidably mounted on the guide shaft; and at least one reflecting element arranged along a light path between the object lens system and the eye-piece lens system.

7. The view finder of claim 6, wherein the object lens system comprises two said movable object lenses, the view finder further comprising:

a rotatable cam plate with two cam grooves, one end of each of the two movable object lenses being engaged with a respective one of the cam grooves, so that rotation of the cam plate causes the two movable object lenses to move along an optical axis of the object lens system.

* * * * *